United States Patent
Bashyam et al.

(10) Patent No.: US 7,328,267 B1
(45) Date of Patent: Feb. 5, 2008

(54) TCP PROXY CONNECTION MANAGEMENT IN A GIGABIT ENVIRONMENT

(75) Inventors: Murali Bashyam, Fremont, CA (US); Norman W. Finn, Livermore, CA (US); Abhijit Patra, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 865 days.

(21) Appl. No.: 10/137,628

(22) Filed: May 2, 2002

Related U.S. Application Data

(63) Continuation of application No. 10/051,634, filed on Jan. 18, 2002.

(51) Int. Cl.
 *G06F 15/16* (2006.01)
(52) U.S. Cl. ............ 709/227; 709/228; 709/235
(58) Field of Classification Search ........ 709/203, 709/223–230, 240, 213, 217; 455/435; 718/105
 See application file for complete search history.

(56) References Cited

U.S. PATENT DOCUMENTS

| | | | | |
|---|---|---|---|---|
| 5,438,614 A * | 8/1995 | Rozman et al. | ......... | 379/93.08 |
| 6,067,477 A * | 5/2000 | Wewalaarachchi et al. | ... | 700/83 |
| 6,122,666 A * | 9/2000 | Beurket et al. | ........... | 709/226 |
| 6,157,648 A * | 12/2000 | Voit et al. | ................ | 370/401 |
| 6,247,050 B1 * | 6/2001 | Tso et al. | .................. | 709/224 |
| 6,330,602 B1 * | 12/2001 | Law et al. | ................ | 709/224 |
| 6,381,644 B2 * | 4/2002 | Munguia et al. | ........... | 709/225 |
| 6,519,636 B2 * | 2/2003 | Engel et al. | .............. | 709/223 |
| 6,549,943 B1 * | 4/2003 | Spring | ...................... | 709/223 |
| 6,571,277 B1 * | 5/2003 | Daniels-Barnes et al. | ... | 709/213 |
| 6,625,447 B1 * | 9/2003 | Rossmann | .............. | 455/426.1 |
| 6,636,503 B1 * | 10/2003 | Shiran et al. | ............. | 370/352 |
| 6,665,705 B1 * | 12/2003 | Daniels-Barnes et al. | ... | 709/203 |
| 6,735,634 B1 * | 5/2004 | Geagan et al. | ............ | 709/235 |
| 6,751,747 B2 * | 6/2004 | Li | ................................ | 714/4 |
| 6,859,835 B1 * | 2/2005 | Hipp | ......................... | 709/227 |
| 6,868,538 B1 * | 3/2005 | Nixon et al. | ............... | 717/100 |
| 6,871,347 B2 * | 3/2005 | Hay | ........................... | 718/105 |
| 6,885,673 B1 * | 4/2005 | Tzeng et al. | .............. | 370/412 |
| 6,892,235 B1 * | 5/2005 | Daude et al. | ............. | 709/224 |
| 6,947,444 B2 * | 9/2005 | Heller | ....................... | 370/466 |
| 6,985,939 B2 * | 1/2006 | Fletcher et al. | ........... | 709/223 |
| 7,003,572 B1 * | 2/2006 | Lownsbrough et al. | .... | 709/227 |
| 7,028,092 B2 * | 4/2006 | MeLampy et al. | ......... | 709/230 |
| 2001/0034771 A1 * | 10/2001 | Hutsch et al. | ............ | 709/217 |
| 2001/0047421 A1 * | 11/2001 | Sridhar et al. | ............ | 709/230 |

(Continued)

*Primary Examiner*—Thong Vu
(74) *Attorney, Agent, or Firm*—Campbell Stephenson LLP

(57) ABSTRACT

The present invention describes a method and apparatus to effectively manage data buffers for a client and a server connection in a multiple connection environment. The TCP processes of servers and clients are merged into an independent TCP process in a TCP 'proxy' server. The TCP proxy server includes a control unit and a data switching unit (the proxy application). The TCP proxy server terminates the client TCP connection and initiates a separate TCP connection with the server. The data switching unit binds the two individual connections. The TCP proxy server portrays the actual server TCP. The control unit in the TCP proxy server manages data buffers, control memory and supports multiple connections. The control unit 'pushes' the data into the buffers by monitoring the use of the buffers. The control unit does not wait for data requests from the data switching unit thus, eliminating the overhead of data request messages.

60 Claims, 5 Drawing Sheets

U.S. PATENT DOCUMENTS

| | | | |
|---|---|---|---|
| 2002/0002611 A1* | 1/2002 | Vange et al. | 709/223 |
| 2002/0007393 A1* | 1/2002 | Hamel | 709/203 |
| 2002/0032781 A1* | 3/2002 | Yoshida et al. | 709/228 |
| 2002/0059435 A1* | 5/2002 | Border et al. | 709/228 |
| 2002/0065784 A1* | 5/2002 | Ranzini et al. | 705/64 |
| 2002/0098840 A1* | 7/2002 | Hanson et al. | 455/435 |
| 2002/0112073 A1* | 8/2002 | MeLampy et al. | 709/240 |
| 2002/0138614 A1* | 9/2002 | Hall | 709/225 |
| 2003/0005144 A1* | 1/2003 | Engel et al. | 709/235 |
| 2003/0051026 A1* | 3/2003 | Carter et al. | 709/224 |
| 2003/0091058 A1* | 5/2003 | Oates et al. | 370/442 |
| 2003/0091267 A1* | 5/2003 | Alvarez et al. | 385/16 |
| 2006/0095945 A1* | 5/2006 | Carpenter et al. | 725/87 |
| 2006/0123130 A1* | 6/2006 | Shah et al. | 709/230 |

* cited by examiner

TCP PROXY CONNECTION MANAGEMENT IN A GIGABIT ENVIRONMENT

This application is a continuation of prior U.S. patent application Ser. No. 10/051,634, entitled "TCP Proxy Connection Management In A Gigabit Environment," filed Jan. 18, 2002, and naming Murali Bashyam as the first inventor.

BACKGROUND OF THE INVENTION

1. Field of the Invention

The present invention relates to packet switching and routing protocols, specifically to Transmission Control Protocol (TCP) management techniques.

2. Description of the Related Art

Generally, in data communication over TCP/IP, a client initiates a TCP connection towards the server, the server and client go through a three-way handshake through a TCP proxy to establish a connection between the client and the server. The TCP proxy terminates the client connection and initiates a separate connection towards the server. TCP proxy behaves as a server towards the client and as a client towards the server. TCP proxy provides TCP services that are transparent to the end hosts (e.g., load balancing, web caching, SSL termination or the like)

An application running on the client requests TCP proxy to forward a request for data on the connection to the server. The client's request can span over multiple TCP segments. The TCP proxy receives the request (e.g., data) from the client application, processes the request (e.g., encrypts, decrypts or the like), initiates a connection with the server, manages the connection and data buffers and forwards the request (e.g., data) to the server. An application running on the server services the data request and responses to the client's request (e.g., by requesting the TCP proxy to forward a response, requested data or the like) on the connection to the client. The server response can span over multiple TCP segments.

The TCP proxy generally supports multiple simultaneous TCP connections (e.g., on the order of tens/hundreds of thousands). TCP proxy manages data transfer for each instance of applications associated with each connection. When the TCP proxy receives data from a server into receive buffer for that server connection, the TCP proxy transmits data into a transmit buffer for requesting application on the client's connection. The TCP proxy waits for the client application to 'pull' the data from the transmit buffers. The TCP proxy waits until the transmit buffer has more space.

To support multiple connections, the TCP proxy must optimally manage data buffers and control memory to provide enough buffer space to each connection. Typically, each TCP process advertises a data window size to its peers in a network. The window size reflects the amount of buffer space allocated to each connection. The window size can be fixed based on the available buffer space and the number of 'simultaneously active' connections configured in the server. Because the TCP proxy does not know how the client applications work, the TCP proxy must wait for the client applications to 'pull' data from the transmit buffers. The waiting for client application to 'pull' data reduces the efficiency of the data communication. A method and an apparatus are needed to effectively and optimally manage the data buffers and control memory.

SUMMARY

The present invention describes a method of managing network communications. The method includes terminating a first transmission control protocol ("TCP") connection at a first network element, wherein the first TCP connection is between the first network element and a second network element, and the first TCP connection is intended to be terminated at a third network element, initiating a second TCP connection between the first network element and a third network element, establishing communications between the second and the third network elements via the first network element, determining need for data transfer between the second and the third network elements by monitoring multiple data buffers, and transferring the data between the second and the third network elements.

The method, further includes monitoring the first TCP connection, receiving a request for data from the application, and determining whether the request requires the second TCP connection with one of the multiple of servers. The method, further includes if the request does not require the second TCP connection with one of the multiple of servers, servicing the request for data, and closing the connection with the client. The method, further includes if the request requires the second TCP connection with one of the multiple of servers, selecting a first server from the multiple of servers, and initiating the second TCP connection with the first server. The method, further includes receiving the data on the second TCP connection from the first server, storing the data in the receive buffer of the second TCP connection, transferring the data from the receive buffer to the transmit buffer of the first TCP connection, monitoring space in the transmit buffer, and if the transmit buffer has space, determining whether the fist TCP connection need additional data.

The method, further includes if the first TCP connection need the additional data, requesting the additional data from the first server, and repeating the steps of receiving, storing, transferring, monitoring and determining until the request for data from the application is served. The method, further includes if the request for data from the application is served, closing the first TCP connection with the client.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

INTRODUCTION

The present invention describes a method and apparatus to effectively manage data buffers for a client and a server connection in a multiple connection environment. The TCP processes of servers and clients are merged into an independent TCP process in a TCP 'proxy' server. The TCP proxy server is a special purpose TCP server and functions independently. The TCP proxy server includes a control unit and a data switching unit (the proxy application). The TCP proxy server terminates the client TCP connection and initiates a separate TCP connection with the server. The application on TCP proxy server binds the two individual connections. The actual TCP connection between the client and the server includes two individual TCP connections, a client-proxy connection and a proxy-server connection. The TCP proxy server portrays the actual server TCP and the client side does not know of a separate TCP connection between the TCP proxy server and the server. The control unit in the TCP proxy server manages data buffers, control memory and supports multiple connections.

The TCP proxy server has the knowledge of the data need for each connection. Instead of waiting for the proxy application 'pull' (request) data, the control unit 'pushes' the data into the buffers by monitoring the use of the buffers. The control unit does not wait for data requests thus, eliminating the overhead of data request messages.

According to an embodiment of the present invention, when a connection is established, a control block for the connection is divided into two individual control memory entries, a flow entry and a connection block entry. The TCP uses both control memory entries to process the connection. When the state of the connection is set to a predefined state, TCP releases the connection block entry and maintains flow entry. The flow entry is released after the connection is terminated (closed). When the connection block entry is released, the memory space assigned to the control block entry becomes available for use by other connections supported by the TCP. The release of connection block entry reduces the need for extra memory to support multiple simultaneous active connections and allows the TCP proxy to support additional active connections.

System Architecture

Figure 1:
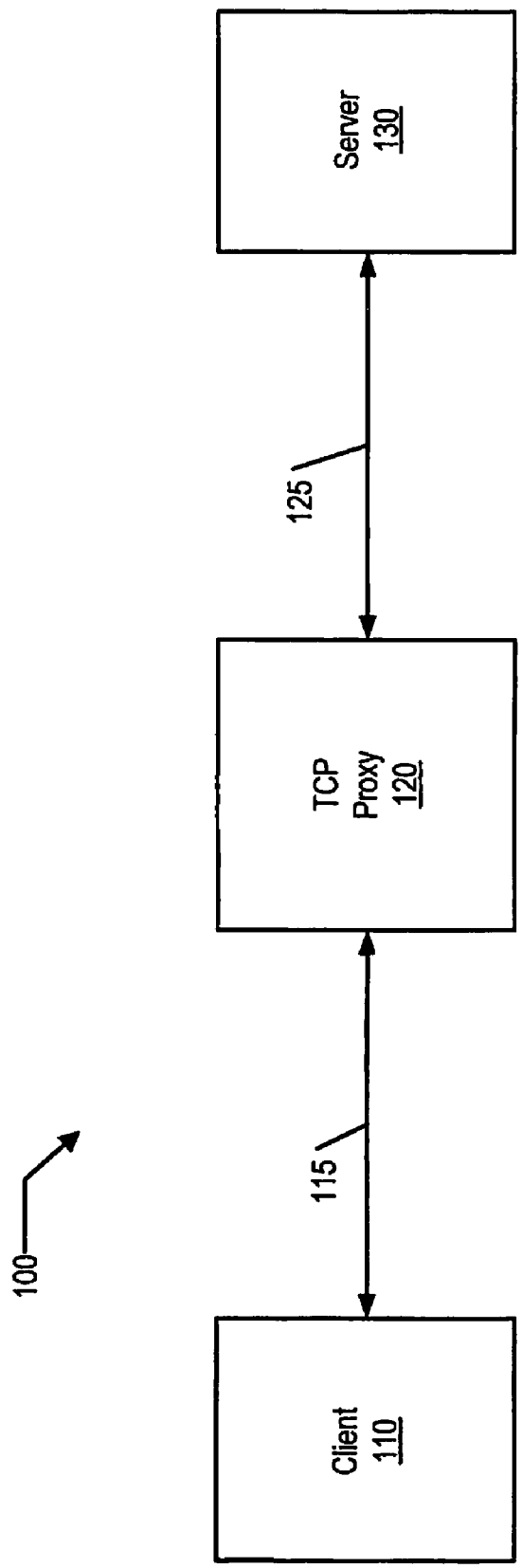
FIG. 1 illustrates an example of an architecture of a system according to an embodiment of the present invention.

FIG. 1 illustrates an example of an architecture of a system 100 according to an embodiment of the present invention. System 100 includes a client 110. Client 110 can be any data processing element (e.g., user personal computer, local area network or the like). Client 110 is coupled via a link 115 to a TCP proxy 120. Link 115 can be any data connection between client 110 and TCP proxy 120 (e.g., internet, direct dialed, wireless or the like). TCP proxy 120 is coupled via a link 125 to a server 130. Link 125 can be any data connection between TCP proxy 120 and server 130 (i.e., e.g., local area network, direct dialed, wireless or the like).

When an application in client 110 initiates a connection with server 130, TCP proxy 120 acts as server 130 and terminates the connection. For the application on client 120, the termination of the connection at TCP proxy 120 indicates that a connection with server 130 has been established. TCP proxy 120 then initiates another TCP connection with server 130. When a connection between TCP proxy 120 and server 130 is established, the application on TCP proxy 120 binds both connections and an end-to-end TCP connection between client 120 and server 130 is completed. The TCP connection between client 110 and server 130 includes two individual TCP connections, a client 110 to TCP proxy 120 connection and a TCP proxy 120 to server 130 connection. Client 110 is not aware of a separate connection and assumes a direct connection with server 130. TCP proxy 120 is transparent to client 110. TCP proxy 120 responds to data requests from applications in client 110, and transmits and receives the requested data from server 130.

Figure 2A:
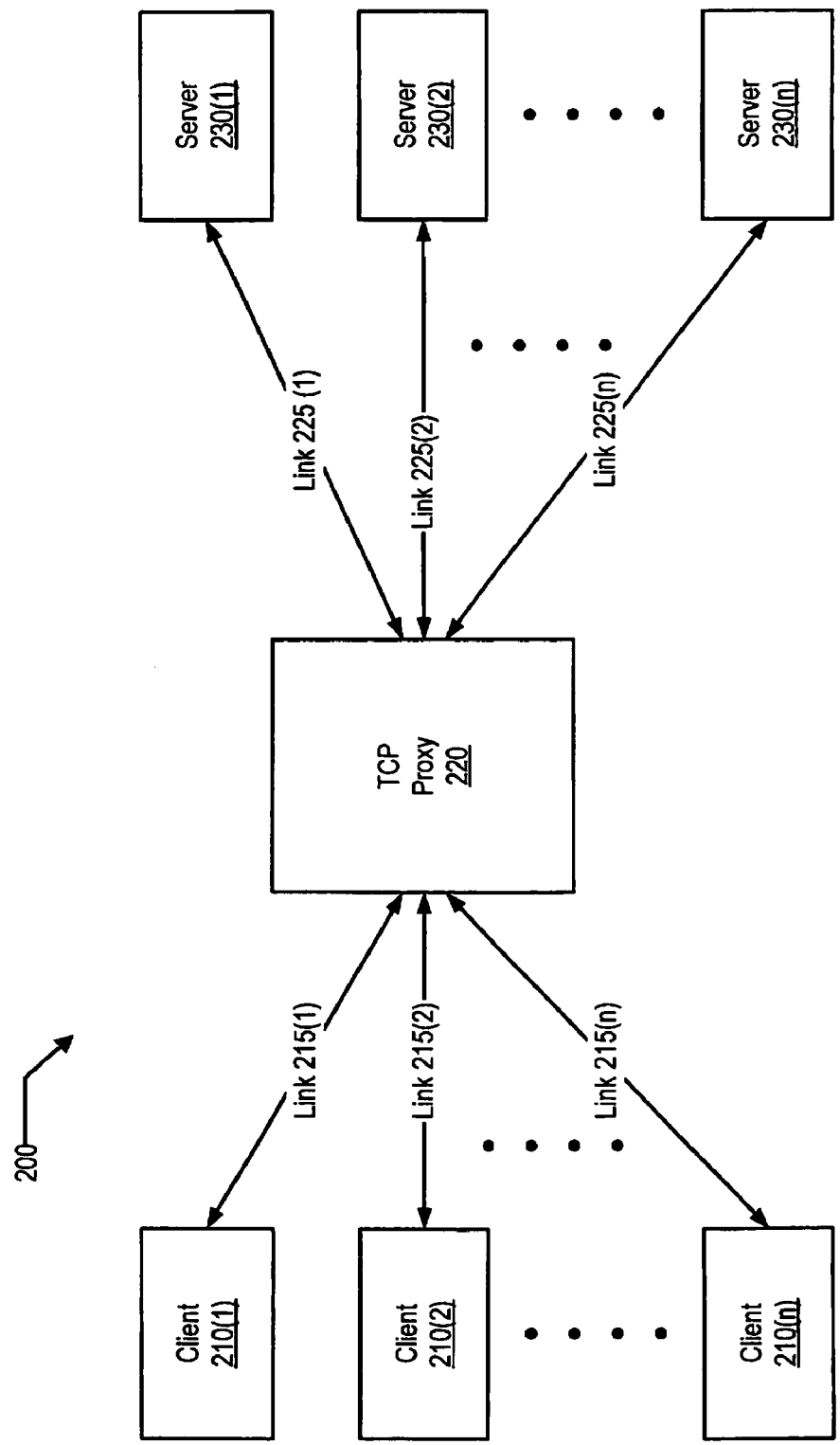
FIG. 2A illustrates an example of an architecture of a multi client-server system according to an embodiment of the present invention.

FIG. 2A illustrates an example of an architecture of a multi-client/server system 200 according to an embodiment of the present invention. System 200 includes 'n' clients, clients 210(1)-(n). Each client is coupled via 'n' links, links 215(X) to a TCP proxy 220, where X is the number of the client. For example, client 210(1) is coupled to TCP proxy 220 via link 215(1), client 210(2) is coupled to TCP proxy 220 via link 215(2) and so on. Link 215(X) can be any data connection between client 210(X) and TCP proxy 220 (e.g., via Internet, direct dialed, local network host connection, wireless or the like). TCP proxy 220 is coupled via 'n' links, links 225(Y) to 'n' servers, servers 230(1)-(n) where Y is the number of the server. For example, TCP proxy 220 is coupled to server 230(1) via link 225(1), server 220(2) via link 225(2) and so on. Link 225(Y) can be any data connection between TCP proxy 220 and server 230(Y) (e.g., via Internet, direct dialed, network host connection, wireless or the like).

TCP proxy 220 is configured to support multiple client connections. TCP proxy 220 monitors the connections for each client. When a client application initiates a connection for a server, TCP proxy 220 processes the connection request. For the purposes of illustration, an application on client 210(1) initiates a connection for server 230(2) and sends a data request to TCP proxy 220. TCP proxy 220 terminates the connection. The application on client 210(1) thinks that a connection with server 230(2) has been established. TCP proxy 220 can process the request in various ways (e.g., provide the requested data, make a connection with server 230(2), provide the requested data from any other server or the like). For example, if server 230(2) is out of service but the requested data can be obtained from any other server (e.g., server 230(1)), TCP proxy 220 can retrieve data from other servers (e.g., server 230(1)) and respond to the request from the application on client 210(1). The actions of TCP proxy 220 are transparent to the application on client 210(1).

Conventionally, the TCP requests the data from the servers and makes that data available in the buffers for the application. When the application retrieves the data from the buffers, the TCP requests more data from the server. According to one embodiment of the present invention, TCP proxy 220 functions as a special purpose TCP processor. TCP proxy 220 is configured as the TCP processes for each client. TCP proxy 220 has the knowledge of the functioning of each connection and knows when a connection is ready to send/receive data. Thus, TCP proxy 220 can have data ready for the connection before the application requests the data. Similarly, TCP proxy 220 can retrieve data from servers accordingly. Typically, the application on each connection requests data after the application has 'pulled' the data from the buffers. The data request messages cause additional data transmission overhead affecting the speed of the data transaction. Also, the client applications consume significant data processing time. According to an embodiment of the present invention, the knowledge of processing on each connection in TCP proxy 220 enables TCP proxy 220 to 'push' data into the appropriate buffers before the application requests the data. Thus, eliminating the overhead of data request messages.

Data Buffer Management

Figure 2B:
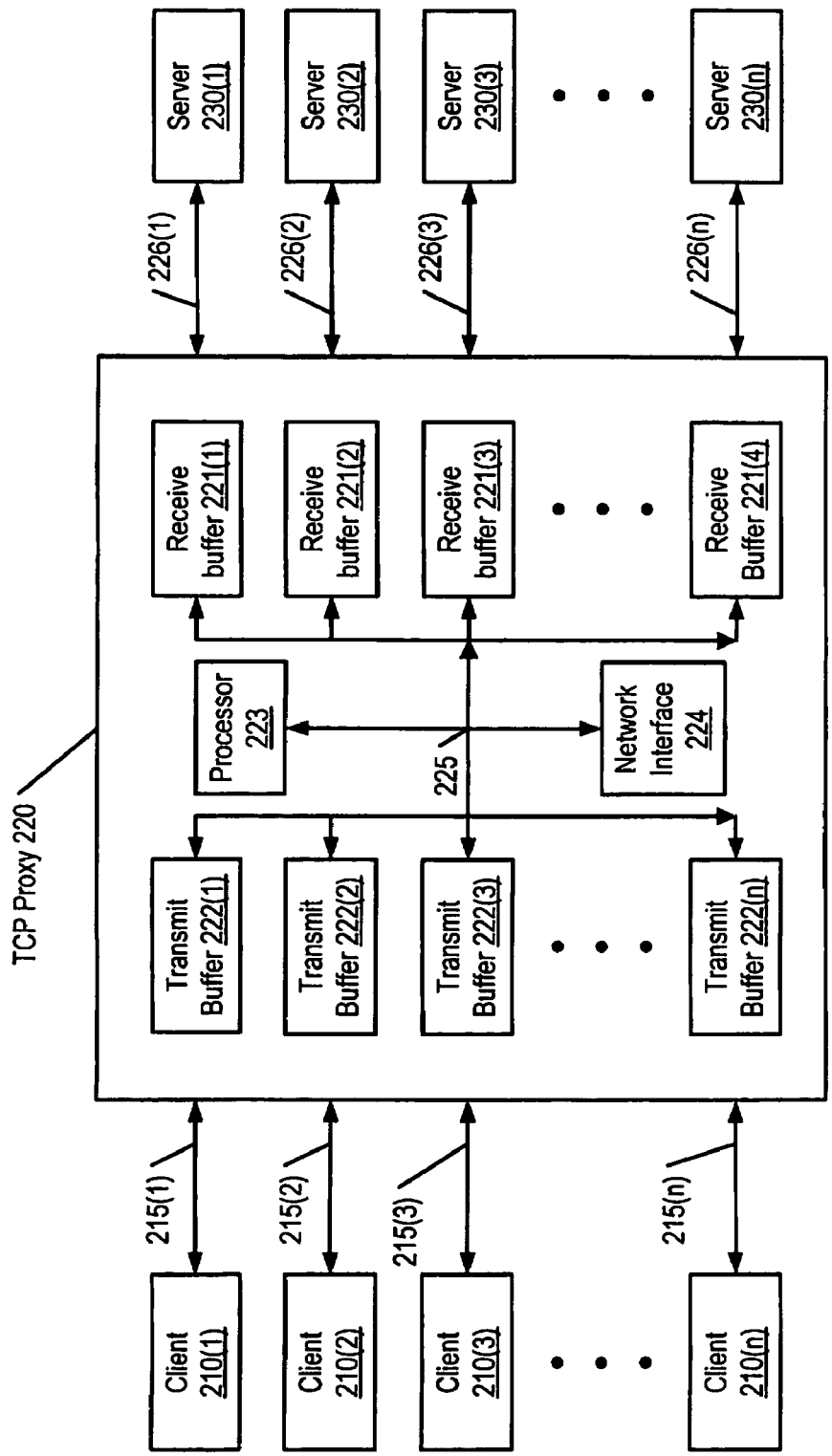
FIG. 2B illustrates an example of data buffer management in a multi client-server system according to an embodiment of the present invention.

FIG. 2B illustrates an example of data buffer management in a multi client-server system 200 according to an embodiment of the present invention. System 200 includes 'n' clients, clients 210(1)-(n). Each client is coupled via 'n' links, links 215(X) to a TCP proxy 220, where X is the number of the client. For example, client 210(1) is coupled to TCP proxy 220 via link 215(1), client 210(2) is coupled to TCP proxy 220 via link 215(2) and so on. Link 215(X) can be any data connection between client 210(X) and TCP proxy 220 (e.g., via Internet, direct dialed, local network host connection, wireless or the like). TCP proxy 220 includes 'n' client-side receive buffers, receive buffers 221(1)-(n). TCP proxy 220 further includes 'n' server-side transmit buffers, transmit buffers 222(1)-(n). A processor 223 in TCP proxy 220 provides controls for TCP processing. A network interface 224 provides input/output interface and network processing for TCP proxy 220. Processor 223 is coupled to various elements in TCP proxy 220 via an internal link 225. Link 225 can be any internal communication mechanism (e.g., internal bus, back plane link or the like).

TCP proxy 220 is coupled via 'n' links, links 226(Y) to 'n' servers, servers 230(1)-(n), where Y is the number of the server. For example, TCP proxy 220 is coupled to server 230(1) via link 226(1), server 220(2) via link 226(2) and so on. Link 226(Y) can be any data connection between TCP proxy 220 and server 230(Y) (e.g., via Internet, direct dialed, network host connection, wireless or the like).

Receive buffers 221(1)-(n) store data received from servers 230(1)-(n). Any receive buffer can be assigned to any server. For the purposes of illustration, in the present example, each receive buffer is associated with a server. For example, receive buffer 221(1) receives data from server 230(1), receive buffer 221(2) receives data from server 230(2) and so on. Transmit buffers 222(1)-(n) store data while clients 210(1)-(n) retrieves the data. In the present example, each transmit buffer is associated with a client. For example, client 210(1) receives data from transmit buffer 222(1), client 210(2) receives data from transmit buffer 222(2) and so on.

It will be apparent to one skilled in art while individual client-server transmit and receive buffers are shown, the transmit and receive buffers can be configured according to various memory schemes (e.g., individual memory units, shared memory bank or the like). The buffers can be dynamically allocated/de-allocated using any buffer management scheme known in art. The terms receive and transmit are relative to the data flow from servers to client within TCP proxy 220 and can be used interchangeably. For example, client-side transmit buffers can receive data from client connection when an application on client sends data to a server and server-side receive buffers can store data to be transmitted to servers. Similarly, individual transmit/receive buffers can be assigned for each connection on client and server sides. The number of transmit and receive buffers can be determined based on the amount of memory space available in TCP proxy 220. The buffers can be allocated fairly among active connections. Any transmit or receive buffer can be assigned to any client and server connection. The size of transmit and receive buffers can be configured dynamically based on the number of active connections supported by TCP proxy 220.

Initially, when TCP proxy 220 receives a request for data from one of the client connection, TCP proxy 220 analyzes and processes the request. For the purposes of illustration, client 210(1) initiates a connection to server 230(1) and sends a request for data. TCP proxy 220 receives the connection request and terminates the connection. Client 210(1) assumes that a connection with server 230(1) has been established. TCP proxy 220 then determines that the data can be retrieved from server 230(1) and establishes a connection with server 230(1). According to an embodiment of the present invention, a data switching unit in TCP proxy 220 selects the server for the connection. Both, client 210(1) and server 230(1) terminate the connections at TCP proxy 220. The application on TCP proxy 220 binds both connections. TCP proxy 220 acts as the TCP processor for client 210(1) and server 230(1) connections thus eliminating duplicate message processing between individual TCP processes on client and server. The data received from server 230(1) is stored in one of the receive buffers (e.g., receive buffer 221(1)). TCP proxy 220 transfers the data from the receive buffer (e.g., receive buffer 221(1)) to a transmit buffer (e.g., transmit buffer 210(1)).

Typically, the links between TCP proxy 220 and servers 2301(1)-(n) (e.g., links 226(1)-(n)) are high-speed, high-bandwidth links (e.g., 10 Mbps Ethernet connection or the like) and the links between TCP proxy 220 and clients 210(1)-(n) (e.g., links 215(1)-(n)) are low-speed, low-bandwidth links (e.g., 56 Kbps internet connection or the like). The speed of data received in receive buffers is faster than the speed of data transferred out of the transmit buffers. Conventionally, TCP proxy 220 waits for client 210(1) to 'pull' data out of the transmit buffer (e.g., transmit buffer 222(1)) and send request indicating that the buffer has more space and need more data. However, according to an embodiment of the present invention, TCP proxy 220 has the knowledge of client 210(1) connection and monitors the transmit buffers (e.g., transmit buffer 222(1)).

When TCP proxy 220 determines that the transmit buffers (e.g., transmit buffer 222(1)) have more buffer space available, TCP proxy 220 'pushes' data from receive buffer (e.g., receive buffer 221(1)) to the transmit buffer (e.g., transmit buffer 222(1)). According to one embodiment of the present invention, the control unit in the TCP proxy 220 monitors the buffer usage. Client 210(1) does not ask for more data and data request messages are eliminated (e.g., availability of data space, requesting more data or the like). TCP proxy 220 monitors the connections and knows how much data will be added by the application. Thus, the control unit 'pushes' enough data into the transmit buffers to accommodate the data received and additional data that the application might add. When transmit buffers do not have enough room the data backs-up in receive buffers resulting in a backup of data at the servers. The overall end-to-end connection flow control complies with the conventional TCP guidelines.

TCP proxy 220 can be configured to provide TCP processing for multiple connections. Conventionally, each application has an associated TCP instance. The conventional TCP instance responds to requests from the associated application and performs actions requested by the application. Generally, the interaction with the TCP is minor portion of the application processing. Applications perform many non-TCP related functions. The interaction with the TCP remains idle while the application is performing non-TCP related functions. During data transfer between an application and a server, the TCP process is driven by the associated application. According to an embodiment of the present invention, TCP proxy 220 is configured to function independently and provide support for multiple applications. Each application considers TCP proxy 220 as its dedicated TCP. The control unit in TCP proxy 220 manages the data buffers independently by monitoring the use of data buffers. During data transfer between an application and a server, TCP proxy 220 drives the application on each connection by 'pushing' data into the buffers for each connection before the associated application can request for more data. Thus, eliminating the delay of data transfer request messages and increasing the efficiency of data transfer between the client and server.

Figure 3:
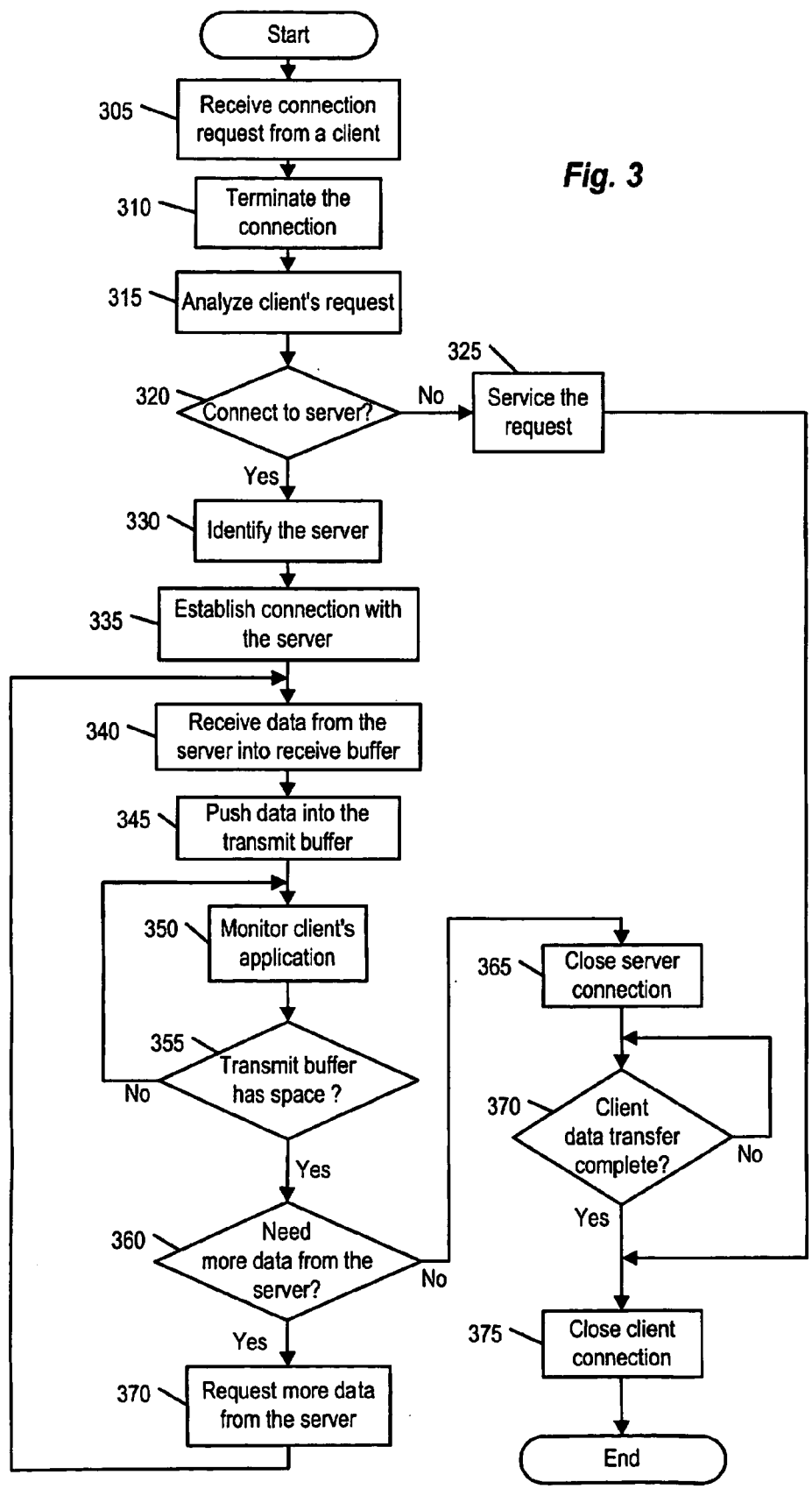
FIG. 3 illustrates an example of actions performed by a TCP proxy server while managing the data buffers according to an example of the present invention.

FIG. 3 illustrates an example of actions performed by a TCP proxy server ("proxy") while managing the data buffers according to an example of the present invention. Initially, the proxy receives a request for server connection from a client (step 305). The proxy terminates (establishes) the connection on behalf of the server (step 310). The proxy then analyzes the request to determine the actions to perform while responding to the request (step 315). The proxy then determines whether to establish a connection with a server (step 320). Depending upon the nature of client's request, the proxy can respond to client's request without establishing a contact with a server. For example, the client's request can be to forward data to a server without any further interaction from the server. In such case, the proxy can store the data for forwarding to the server at a later time.

If the client's request does not require establishing a connection with the server, the proxy services the request (e.g., provide requested data from a local storage, store forwarded data for a later transmission or the like) (step 325). The proxy then proceeds to close client connection (step 375). If the client's request require establishing a connection with a server, the proxy identifies a server (step 330). The client's request can be directed to a particular server however, the proxy can determine to service the request using a different server. Because the proxy terminates (establishes) the client's connection on behalf of the requested server, the proxy can establish a connection with a different server. The proxy identifies a server that can service the client's request (step 330).

The proxy establishes a different connection with the identified server and binds the client and server connections (step 335). The proxy then begins to receive data from the server into a receive buffer allocated to that server connection (step 340). The data received from the server is initially stored in the receive buffers within the proxy. The proxy then 'pushes' the data into the transmit buffer for the client connection (step 345). While the proxy 'pushes' data into the transmit buffer of the client connection, it could continue to receive data from the server in the server connection receive buffers. The proxy monitors the client connection's transmit buffer space to determine the data need (step 350). Once the client connection transmit buffer space is used up, data sent by the server is accumulated in the server connection receive buffer until the receive buffer has no more room, at which point the window-based flow control of TCP causes the remaining data to be stored at the server itself. Thus this flow control between the 2 buffers on the proxy, seamlessly merges with the TCP end-to-end flow control.

When the client retrieves data from the transmit buffers, the proxy knows whether the client connection requires additional data. By monitoring client's connection, the proxy does not wait for the client to request more data. The client continuously receives data from the transmit buffers until the data request has been satisfied. When the client begins to retrieve data from the transmit buffer, the proxy determines whether the transmit buffer has space for more data (step 355). If the transmit buffer does not have space to store more data, the proxy continues to monitor client's connection (step 350). If the transmit buffer has more space, the proxy determines whether to receive more data from the server (step 360). When the client acknowledges the data transmitted by the proxy, the acknowledged data gets dropped from the client connection transmit buffers, creating more space in the transmit buffer. Since the proxy is monitoring for this condition, it determines how much data can be pushed from the server connection receive buffer to the application, and pushes the data appropriately. If more data is needed from the server to complete the client's request, the proxy requests more data from the server (step 370). The proxy proceeds to receive more data from the server (step 340).

If more data is not needed from the server, the proxy closes the server connection (step 365). The proxy then determines whether the client has completed the data transfer from the transfer buffer (step 370). If the client data transmit is not complete, the proxy continues to wait for client to complete the data transmit. If the client data transfer is complete, the proxy closes the client connection.

Control Memory Management

Conventionally, when a connection is established, TCP maintains a control block for the connection. The control block is a portion of control memory that stores various connection-related information (e.g., sequence numbers, window size, retransmission timers and the like). Typically, the size of a control block is on the order of about 300-400 bytes. Before the connection is terminated, TCP sets the state of the connection to TIME_WAIT and initiates a timer (e.g., a 60 second 2MSL timer). When the timer expires, the connection is terminated (closed). In case when TCP has to transmit an ACK during TIME_WAIT state (e.g., when ACK is dropped by a network element or the like), TCP uses the information in the control block to generate another ACK for retransmission. The control block is released after the connection is terminated.

According to an embodiment of the present invention, when a connection is established, the control block for a connection is divided into two individual control memory entries, a flow entry and a connection block entry. The flow entry includes connection-related parameters that are needed for TCP processing during a TIME_WAIT state of the connection (e.g., retransmission of ACK, processing of TCP SYN or the like). The connection block entry includes other conventional connection-related parameters (e.g., round trip time, idle time, largest window size offered by peer and the like). The connection block entry and flow entry are disjoint set of connection related parameters. The TCP proxy uses both control memory entries to process the connection. Because the flow entry includes information needed for TCP processing during the TIME_WAIT state, the size of flow entry is relatively smaller (e.g., 64 bytes or the like) as compared to the size of connection block entry (e.g., 300 bytes or the like).

Table 1 illustrates an example of some of the flow entry fields that are used during the TIME_WAIT state of the connection according to an embodiment of the present invention. The fields described in table 1 are known in art.

TABLE 1

Example of flow entry fields used during the TIME_WAIT state.

| Field | Description |
| --- | --- |
| state | State of the connection |
| rcv_nxt | Next receive sequence number |
| Window | Window size |
| source port | Source port address |
| dest port | Destination port address |
| source IP addr | IP address of the source |
| dest IP addr | IP address of the destination |
| ts_recent | Time stamp echo data |
| ts_recent_age | Time stamp when last updated |
| TOS | Type of service |
| Optional fields | Options negotiated for the connection |

When the state of a connection is set to TIME_WAIT and a timer (e.g., a 60 second 2MSL timer) is initiated, TCP releases the connection block entry and maintains flow entry. The flow entry is released after the connection is terminated (closed). When the connection block entry is released, the memory space assigned to the control block entry becomes available for use by other connections supported by the TCP. The release of connection block entry during TIME_WAIT state reduces the need for extra memory to support multiple simultaneous active connections and allows the TCP proxy to support additional active connections. It will be apparent to one skilled in art that, while two individual control memory entries are described, the control memory block can be divided into any number of sub-control blocks. Each such sub-control block can be released at different stages of the connection processing when the fields described in each sub-control block are not needed to support the connection.

Figure 4:
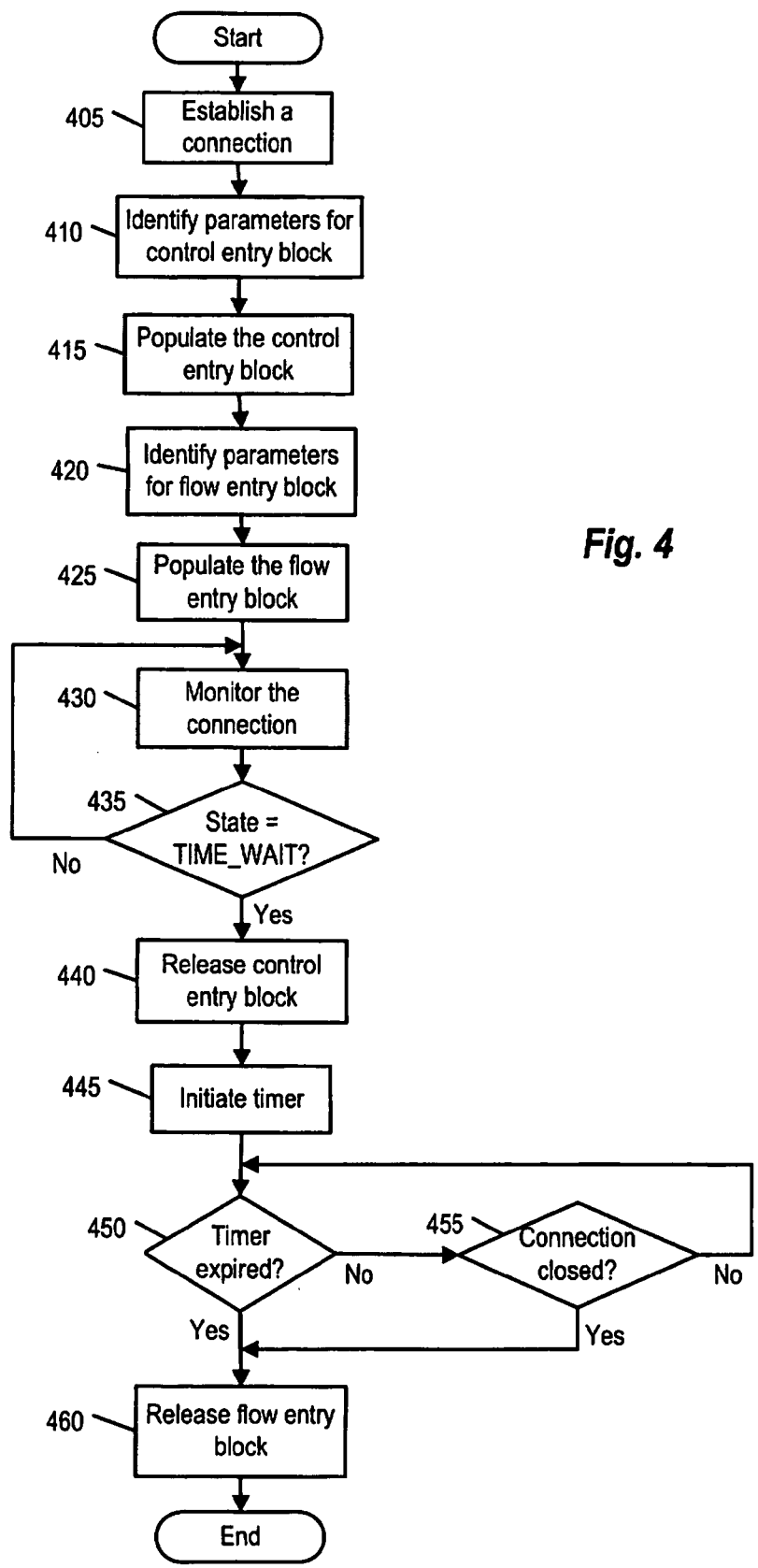
FIG. 4 is a flow diagram illustrating an example of actions performed by a TCP proxy server while managing control memory for a connection according to an embodiment of the present invention.

FIG. 4 is a flow diagram illustrating an example of actions performed by a TCP proxy server ("proxy") while managing control memory for a connection according to an embodiment of the present invention. Initially, the proxy establishes a connection as requested by a client (step 405). The proxy then identifies connection-related parameters for a control block entry for the connection (step 410). The proxy populates the control block entry with the identified parameters (step 420). The proxy then identifies connection-related parameters for a flow entry (step 425). The proxy populates the flow entry with the identified parameters (step 425). The division of connection related parameters between the control block entry and flow entry depend upon the releasability of each block at different stages of the connection. For example, if the control block entry is released when the connection is in the TIME_WAIT state then the control block entry includes connection-related parameters that are not used during the TIME_WAIT state. Similarly, a combination of connection-related parameters can be defined for multiple control memory blocks that can be released at different stages of the connection.

The proxy monitors the control flow for the connection (step 435). The proxy determines whether the state of the connection is set to TIME_WAIT (step 440). If the state of the connection is not set to TIME_WAIT, the proxy continues to monitor the control flow for the connection. If the state of the connection is set to TIME_WAIT, the proxy releases the control block entry (step 445). It will be apparent to one skilled in art that a particular block of control memory can be released during any state of the connection depending on the parameters included in that block. The proxy initiates a timer (e.g., a 60 second 2MSL timer) to wait for the connection to be closed (step 450). The proxy determines whether the timer has expired (step 455). If the timer has not expired, the proxy determines whether the connection has been closed (step 460). If the connection has not been closed, the proxy continues to wait for the connection to be closed. If the connection is closed, the proxy proceeds to release the flow entry block (step 465). Once the timer expires, the proxy releases the flow entry block of the control memory (step 465).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
    managing a control memory of a network element, wherein
        said control memory is used in managing a first Transmission Control Protocol (TCP) connection,
        said network element is communicatively coupled to a first network element via a second TCP connection,
        said network element is communicatively coupled to a second network element via said first TCP connection, and
        said managing comprises
            identifying a plurality of parameters for said first TCP connection;
            populating said plurality of parameters into a plurality of control memory entries in said control memory; and
            releasing said plurality of control memory entries in a plurality of states of said first TCP connection.

2. The method of claim 1, wherein
    said network element comprises a TCP proxy server,
    said first network element comprises a client,
    said second network element comprises a server, and
    said method is performed by said TCP proxy server.

3. The method of claim 2, further comprising:
    identifying a first subset of parameters needed for processing said first TCP connection in a TIME_WAIT state from said plurality of parameters.

4. The method of claim 3, further comprising:
    populating said first subset of parameters in a field entry of said control memory.

5. The method of claim 4, further comprising:
    populating remaining parameters of said plurality of parameters in a control block entry of said control memory.

6. The method of claim 5, further comprising;
    monitoring said plurality of states of said first TCP connection.

7. The method of claim 6, further comprising:
if said first TCP connection is in said TIME_WAIT state,
releasing said control block entry of said control memory.

8. The method of claim 7, further comprising:
using a flow entry to process said first TCP connection in said TIME_WAIT state.

9. The method of claim 7, further comprising:
initiating a timer.

10. The method of claim 9, wherein said timer is a 60 second timer.

11. The method of claim 10, further comprising:
determining whether said timer has expired.

12. The method of claim 11, further comprising:
if said timer has expired,
releasing a flow entry of said control memory.

13. The method of claim 11, further comprising:
if said timer has not expired,
determining if said first TCP connection is closed.

14. The method of claim 13, further comprising:
if said first TCP connection is closed,
releasing a flow entry of said control memory.

15. The method of claim 1, further comprising:
facilitating communications between said first network element and said second network element by maintaining the contents of a data buffer, wherein
data communicated between said first and said second network elements is transferred between said first and said second TCP connections via said data buffer, and
said managing said control memory of said network element comprises using said parameters in said control memory to control writing of data to and reading of said data from said buffer by said first and said second TCP connection such that an amount of said data maintained in said buffer is sufficient to satisfy an amount of data needed to satisfy a data requirement of said second TCP connection.

16. A network element comprising:
a control memory; and
a processor, wherein
said network element is communicatively coupled to a first network element via a second Transmission Control Protocol (TCP) connection,
said network element is communicatively coupled to a second network element via said first TCP connection, and
said processor is configured to manage said first TCP connection by virtue of being configured to
identify a plurality of parameters for a first TCP connection,
populate said plurality of parameters into a plurality of control memory entries in said control memory, and
release said plurality of control memory entries in a plurality of states of said first TCP connection.

17. The network element of claim 16, wherein
said network element comprises a TCP proxy server,
said first network element comprises a client,
said second network element comprises a server, and
said method is performed by said TCP proxy server.

18. The network element of claim 16, wherein said processor is further configured to
identify a first subset of parameters needed for processing said first TCP connection in a TIME_WAIT state from said plurality of parameters.

19. The network element of claim 18, wherein said processor is further configured to
populate said first subset of parameters in a field entry of said control memory.

20. The network element of claim 19, wherein said processor is further configured to
populate remaining parameters of said plurality of parameters in a control block entry of said control memory.

21. The network element of claim 20, wherein said processor is further configured to
monitor said plurality of states of said first TCP connection.

22. The network element of claim 21, wherein said processor is further configured to
if said first TCP connection is in said TIME_WAIT state,
release said control block entry of said control memory.

23. The network element of claim 22, wherein said processor is further configured to
use a flow entry to process said first TCP connection in said TIME_WAIT state.

24. The network element of claim 23, wherein said processor is further configured to
initiate a timer.

25. The network element of claim 24, wherein said timer is a 60 second timer.

26. The network element of claim 25, wherein said processor is further configured to
determine whether said timer has expired.

27. The network element of claim 26, wherein said processor is further configured to
if said timer has expired,
release a flow entry of said control memory.

28. The network element of claim 26, wherein said processor is further configured to
if said timer has not expired,
determine if said first TCP connection is closed.

29. The network element of claim 28, wherein said processor is further configured to
if a first TCP connection is closed,
release said flow entry of said control memory.

30. The network element of claim 16, wherein said processor is further configured to manage said first TCP connection by virtue of being configured to
facilitate communications between said first network element and said second network element by maintaining the contents of a data buffer, wherein
data communicated between said first and said second network elements is transferred between said first and said second TCP connections via said data buffer, and
said managing said control memory of said network element comprises using said parameters in said control memory to control writing of data to and reading of said data from said buffer by said first and said second TCP connection such that an amount of said data maintained in said buffer is sufficient to satisfy an amount of data needed to satisfy a data requirement of said second TCP connection.

31. A computer program product encoded in computer readable media, said program product comprising a set of instructions executable on a network element, said set of instructions configured to
identify a plurality of parameters for a first Transmission Control Protocol (TCP) connection, wherein
said network element is communicatively coupled to a first network element via a second TCP connection, and said network element is communicatively coupled to a second network element via said first TCP connection;
populate said plurality of parameters into a plurality of control memory entries of a control memory, wherein said control memory is used in managing said first TCP connection; and
release said plurality of control memory entries in a plurality of states of said first TCP connection.

32. The computer program product of claim 31, wherein said network element comprises a TCP proxy server, said first network element comprises a client, said second network element comprises a server, and said set of instructions are executed said TCP proxy server.

33. The computer program product of claim 31, wherein said set of instructions is further configured to
identify a first subset of parameters needed for processing said first TCP connection in a TIME_WAIT state from said plurality of parameters.

34. The computer program product of claim 33, wherein said set of instructions is further configured to
populate said first subset of parameters in a field entry of said control memory.

35. The computer program product of claim 34, wherein said set of instructions is further configured to
populate remaining parameters of said plurality of parameters in a control block entry of said control memory.

36. The computer program product of claim 35, wherein said set of instructions is further configured to
monitor said plurality of states of said first TCP connection.

37. The computer program product of claim 36, wherein said set of instructions is further configured to
if said first TCP connection is in said TIME_WAIT state, release said control block entry of said control memory.

38. The computer program product of claim 37, wherein said set of instructions is further configured to
use a flow entry to process said first TCP connection in said TIME_WAIT state.

39. The computer program product of claim 37, wherein said set of instructions is further configured to
initiate a timer.

40. The computer program product of claim 39, wherein said timer is a 60 second timer.

41. The computer program product of claim 40, wherein said set of instructions is further configured to
determine whether said timer has expired.

42. The computer program product of claim 41, wherein said set of instructions is further configured to
if said timer has expired,
release a flow entry of said control memory.

43. The computer program product of claim 41, wherein said set of instructions is further configured to
if said timer has not expired,
determine if said first TCP connection is closed.

44. The computer program product of claim 43, wherein said set of instructions is further configured to
if said first TCP connection is closed,
release said flow entry of a control memory.

45. The computer program product of claim 31, wherein said set of instructions are further configured to
facilitate communications between said first network element and said second network element by maintaining the contents of a data buffer, wherein
data communicated between said first and said second network elements is transferred between said first and said second TCP connections via said data buffer, and
said managing said control memory of said network element comprises using said parameters in said control memory to control writing of data to and reading of said data from said buffer by said first and said second TCP connection such that an amount of said data maintained in said buffer is sufficient to satisfy an amount of data needed to satisfy a data requirement of said second TCP connection.

46. A network element comprising:
means for identifying a plurality of parameters for a first Transmission Control Protocol (TCP) connection, wherein
said network element is communicatively coupled to a first network element via a second TCP connection, and
said network element is communicatively coupled to a second network element via said first TCP connection;
a control memory, wherein
said control memory comprises a plurality of control memory entries, and
said control memory comprises means for managing said first TCP connection;
means for populating said plurality of parameters into said control memory entries, wherein
said means for populating is coupled to said means for identifying and said control memory; and
means for releasing said control memory entries in a plurality of states of said first TCP connection, wherein
said means for releasing is coupled to said control memory.

47. The network element of claim 46, wherein
said network element comprises a TCP proxy server
said first network element comprises a client, and
said second network element comprises a server.

48. The network element of claim 46, further comprising:
means for identifying a first subset of parameters needed for processing said first TCP connection in a TIME_WAIT state from said plurality of parameters.

49. The network element of claim 48, further comprising:
means for populating said first subset of parameters in a field entry of said control memory.

50. The network element of claim 49, further comprising:
means for populating remaining parameters of said plurality of parameters in a control block entry of said control memory.

51. The network element of claim 50, further comprising;
means for monitoring said plurality of states of said first TCP connection.

52. The network element of claim 51, further comprising:
means for releasing said control block entry of said control memory if said first TCP connection is in said TIME_WAIT state.

53. The network element of claim 52, further comprising:
means for using a flow entry to process said first TCP connection in said TIME_WAIT state.

54. The network element of claim 52, further comprising:
means for initiating a timer.

55. The network element of claim 54, wherein said timer is a 60 second timer.

56. The network element of claim 55, further comprising:
means for determining whether said timer has expired.

57. The network element of claim 56, further comprising:
means for releasing said flow entry of said control memory if said timer has expired.

58. The network element of claim 56, further comprising:
means for determining if said first TCP connection is closed if said timer has not expired.

59. The network element of claim 58, further comprising:
means for releasing a flow entry of said control memory if said first TCP connection is closed.

60. The network element of claim 46, wherein
means for facilitating communications between said first network element and said second network element comprising means for maintaining the contents of a data buffer, wherein data communicated between said first and said second network elements is transferred between said first and said second TCP connections via said data buffer, and said means for managing said control memory of said network element comprises means for using said parameters in said control memory to control means for writing of data to and means for reading of said data from said buffer by said first and said second TCP connection such that an amount of said data maintained in said buffer is sufficient to satisfy an amount of data needed to satisfy a data requirement of said second TCP connection.

* * * * *